(12) United States Patent
Gallagher et al.

(10) Patent No.: US 11,283,917 B2
(45) Date of Patent: Mar. 22, 2022

(54) APPARATUS, DEVICES, METHODS AND COMPUTER PROGRAMS RELATING TO ACTIONABLE OBJECTS

(71) Applicant: IOVOX Ltd., London (GB)

(72) Inventors: Ryan Gallagher, Tiburon, CA (US); Mark Carbonaro, Novato, CA (US)

(73) Assignee: IOVOX Ltd., London (GB)

( * ) Notice: Subject to any disclaimer, the term of this patent is extended or adjusted under 35 U.S.C. 154(b) by 0 days.

(21) Appl. No.: 16/034,277

(22) Filed: Jul. 12, 2018

(65) Prior Publication Data

US 2019/0045050 A1     Feb. 7, 2019

Related U.S. Application Data

(60) Provisional application No. 62/531,970, filed on Jul. 13, 2017.

(51) Int. Cl.
*H04M 3/436* (2006.01)
*H04M 1/724* (2021.01)
(Continued)

(52) U.S. Cl.
CPC ........ *H04M 3/2218* (2013.01); *G06F 16/907* (2019.01); *H04M 1/2757* (2020.01);
(Continued)

(58) Field of Classification Search
CPC ............... H04M 3/2218; G06F 16/907; H04Q 2213/135
(Continued)

(56) References Cited

U.S. PATENT DOCUMENTS 8,681,966 B1    3/2014  Gouez et al.
8,705,707 B1 *  4/2014  Schilit ................. H04M 3/4931
                                                    379/88.11
(Continued)

FOREIGN PATENT DOCUMENTS

EP          3076646 B1      5/2020
KR    1020090042528 A       4/2009
(Continued)

OTHER PUBLICATIONS

International Search Report and Written Opinion of the International Searching Authority for International Application No. PCT/US2018/041901 dated Nov. 28, 2018.
(Continued)

*Primary Examiner* — Ahmad F. Matar
*Assistant Examiner* — Jirapon Intavong
(74) *Attorney, Agent, or Firm* — Scheinberg & Associates, PC; Michael Scheinberg; John Kelly

(57) ABSTRACT

A method and system are disclosed for enabling a telephone call to be made an actionable object and enabling that actionable object to be updated. The user device may have a graphical user interface on which the phone call is presented as an actionable object. The user device may be the same device (e.g. a smartphone) on which the call was made and/or may be a separate device (e.g. a desktop or laptop or tablet computer or the like). The data received by the computer apparatus may be for example one or more of start time of the call, end time of the call, duration of the call, telephone number of the third party, location of the user and call disposition.

32 Claims, 7 Drawing Sheets

(51) Int. Cl.
  *H04M 3/22* (2006.01)
  *G06F 16/907* (2019.01)
  *H04M 1/2757* (2020.01)
  *H04M 1/72403* (2021.01)
  *H04M 3/487* (2006.01)
  *H04M 3/42* (2006.01)

(52) U.S. Cl.
  CPC ....... *H04M 1/72403* (2021.01); *H04M 3/436* (2013.01); *H04M 3/42059* (2013.01); *H04M 3/487* (2013.01); *H04M 2203/556* (2013.01); *H04M 2250/60* (2013.01)

(58) Field of Classification Search
  USPC .................................................. 379/201.03
  See application file for complete search history.

(56) References Cited

U.S. PATENT DOCUMENTS

| | | | |
|---|---|---|---|
| 9,420,105 | B2 | 8/2016 | Gouez et al. |
| 9,680,995 | B2 * | 6/2017 | Tendick .............. H04M 3/5175 |
| 10,044,862 | B1 * | 8/2018 | Cai .................... H04M 3/5183 |
| 2003/0187672 | A1 * | 10/2003 | Gibson ................ G06Q 30/016 |
| | | | 709/206 |
| 2006/0198504 | A1 * | 9/2006 | Shemisa ........... H04M 3/42221 |
| | | | 379/201.02 |
| 2011/0075828 | A1 * | 3/2011 | Okita .................. H04M 3/2218 |
| | | | 379/201.02 |
| 2013/0303130 | A1 * | 11/2013 | Dhodapkar ........... H04M 1/656 |
| | | | 455/412.1 |
| 2015/0004949 | A1 * | 1/2015 | Fienberg ............. H04M 3/5231 |
| | | | 455/414.1 |
| 2015/0304491 | A1 | 10/2015 | Gindi |
| 2016/0360356 | A1 | 12/2016 | Gouez et al. |
| 2017/0134316 | A1 | 5/2017 | Cohen et al. |

FOREIGN PATENT DOCUMENTS

| | | |
|---|---|---|
| KR | 1020100028620 A | 3/2010 |
| KR | 1020130099554 A | 9/2013 |

OTHER PUBLICATIONS

Jul. 22, 2021 Patent Examination Report from the New Zealand Patent Office for corresponding NZ App. No. 761121.

Feb. 26, 2021 European Supplemental Search Report for corresponding EP. App. No. 18832335.6.

* cited by examiner

APPARATUS, DEVICES, METHODS AND COMPUTER PROGRAMS RELATING TO ACTIONABLE OBJECTS

This application claims priority from U.S. Provisional Application No. 62/531,970 filed Jul. 13, 2017, which is hereby incorporated by reference.

TECHNICAL FIELD OF THE INVENTION

The present disclosure relates to apparatus, devices, methods and computer programs relating to actionable objects, in particular actionable objects relating to phone calls.

BACKGROUND OF THE INVENTION

Various systems for tracking, logging, and monitoring of telephone calls are known. These are typically to enable an organisation to analyse telephone calls made by employees or other members of the organisation to persons outside the organisation, such as customers of the organisation. Other systems are known that enable an organisation to analyse telephone calls made into the organisation, for example in response to an advertising campaign.

SUMMARY OF THE INVENTION

According to a first aspect disclosed herein, there is provided computer apparatus providing a back-end server function to enable phone calls to be actionable objects on a user device, the computer apparatus comprising: a processor and data storage; the data storage being arranged to store data relating to phone calls made by a user with third parties; the processor and data storage being constructed and arranged to: receive data relating to a phone call being made or having been made by a user with a third party and to add the data to the data storage, the phone call being at least one of an outgoing phone call and an incoming phone call; and transmit to the user device data relating to the phone call made by the user with the third party, the transmitted data enabling the user device to create or update an actionable object relating to the call with the third party on the user device. This enables a telephone call to be made an actionable object and enables that actionable object to be updated. The user device may have a graphical user interface on which the phone call is presented as an actionable object. The user device may be the same device (e.g. a smartphone) on which the call was made and/or may be a separate device (e.g. a desktop or laptop or tablet computer or the like). The data received by the computer apparatus may be for example one or more of start time of the call, end time of the call, duration of the call, telephone number of the third party, location of the user and call disposition.

In an example, the processor and data storage are arranged to query a remote database to obtain at least some of the data relating to the phone call being made or having been made by a user.

In some examples, the data relating to the phone call being made or having been made by a user and which is received by the computer apparatus may be provided entirely from the phone device with which the user made the call. In other examples, as here, at least some of that data may be obtained from a remote database. Which option is used will depend at least in part on what data is available, or at least is readily available, from the phone device with which the user made the call.

In an example, the processor and data storage are arranged to receive data relating to the location of the user when the call was made and to update data in the data storage relating to phone calls made by the user in accordance with the received location data. Location data may be used to provide one or more type of location-based call functionality. For example, the location of the caller may be identified as being a work location for the user, such that the system can infer that the call was work-related, or the location of the caller may be identified as being a home location for the user, such that the system can infer that the call was not work-related. This in turn can be used to tailor the actionable object relating to the call with the third party on the user device more appropriately.

In an example, the processor and data storage are constructed and arranged to receive data relating to the location of the third party when the call was made and to update data in the data storage relating to phone calls made by the user in accordance with the received location data. The data relating to the location of the user when the call was made may be obtained from for example the device on which the call was made.

In an example, the processor and data storage are constructed and arranged to store registration details of plural phone devices associated with a user, the processor and data storage being constructed and arranged to receive data relating to calls made by the user using any of the plurality of phone devices associated with the user and to consolidate the data. This enables the user to use one of a number of different phone devices, including for example one or more landline phones (e.g. a work phone and a home phone), one or more mobile or cellular phones, etc., and for the computer apparatus to consolidate the data from the plural phones for the one user. This can be convenient for the user in some cases as the user is then free to use whichever phone device is convenient for a call at any particular time and yet knows that the server function will be carried out in substantially the same manner regardless.

In an example, the processor and data storage are constructed and arranged to receive data relating to actions selected by use of the actionable object on the user device. Actions selected by use of the actionable object on the user device may include for example following up on a call with a third party, flagging the call (for one purpose or another), adding a note that relates to the call or the third party, etc. The notes may for example be sent to other users, e.g. other users that are identified by the user to be recipients of notes that relate to that specific call, callee or caller, etc.

In an example, the processor and data storage are constructed and arranged such that, on receipt of an instruction initiated by selection of an action by the user to share the data relating to the phone call with a third party, the processor causes the data relating to the phone call to be shared with the third party.

In an example, the processor and data storage are constructed and arranged such that the data relating to the phone call made by the user and that is transmitted to the user device comprises summary analytics relating to the phone call made by the user. The summary analytics may be used at the user device to provide a summary of calls made by the user and associated data. This may be presented in for example a "dashboard" type format on the user device. The summary analytics may comprise one or more of numbers of calls made in a set period of time, type of call (ingoing, outgoing and missed), dates and times of the calls, locations of the calls and topics of the calls.

According to a second aspect disclosed herein, there is provided a method of providing a back-end server function to enable phone calls to be actionable objects on a user device, the method comprising: receiving data relating to a phone call being made or having been made by a user with a third party and to add the data to data storage, the phone call being at least one of an outgoing phone call and an incoming phone call; and transmitting to the user device data relating to the phone call made by the user with the third party, the transmitted data enabling the user device to create or update an actionable object relating to the call with the third party on the user device.

According to a third aspect disclosed herein, there is provided a user device, the user device comprising: a processor, data storage and a screen; the processor and data storage being constructed and arranged to: cause an actionable object to be displayed on the screen, the actionable object relating to a phone call made by a user with a third party, the phone call being at least one of an outgoing phone call and an incoming phone call made by the user. The screen might be integral with the user device, as in for example a smartphone, or a laptop or tablet computer or the like, or may be a separate item, as in for example a desktop computer.

In an example, the processor is arranged to: receive from a server data relating to the phone call made by the user with the third party; and create or update the actionable object on the basis of the data relating to the phone call made by the user with the third party and received from the server.

In an example, the user device is a phone device for making phone calls, the processor being arranged to cause data relating to the phone call made by the user with the third party to be transmitted to a server.

In an example, the processor is arranged to cause data relating to the location of the user when the call was made to be transmitted to a server.

In an example, the processor is arranged to cause data relating to the location of the third party when the call was made to be transmitted to a server.

In an example, the processor is arranged to cause data relating to actions selected by use of the actionable object on the user device to be transmitted to a server.

In an example, the processor is arranged to receive from a server summary analytics relating to phone calls made by the user and to cause display of the summary analytics on the screen.

According to a fourth aspect disclosed herein, there is provided a method of operating a user device, the method comprising: displaying an actionable object on a screen of the user device, the actionable object relating to a phone call made by a user with a third party, the phone call being at least one of an outgoing phone call and an incoming phone call made by the user.

According to a fifth aspect disclosed herein, there is provided a user device, the user device comprising: a processor, data storage and a screen; the processor and data storage being constructed and arranged to: receive from a server summary analytics relating to phone calls made by a user with third parties, the phone calls being at least one of outgoing phone calls and incoming phone calls made by the user; and cause display of the summary analytics on the screen. The screen might be integral with the user device, as in for example a smartphone, laptop or tablet, or may be a separate item, as in for example a desktop computer. The summary analytics may be used at the user device to provide a summary of calls made by the user and associated data. This may be presented in for example a "dashboard" type format on the user device. The summary analytics may comprise one or more of numbers of calls made in a set period of time, type of call (ingoing, outgoing and missed), dates and times of the calls, locations of the calls and topics of the calls.

In an example, the processor is arranged to cause an actionable object to be displayed on the screen, the actionable object relating to a phone call made by a user with a third party, the phone call being at least one of an outgoing phone call and an incoming phone call made by the user.

In an example, the processor is arranged to generate the actionable object on the basis of data relating to the phone call made by the user with the third party and received from a server.

In an example, the processor is arranged to update the actionable object on the basis of data relating to phone calls made by the user with the third party and received from a server.

According to a sixth aspect disclosed herein, there is provided a method of operating a user device, the method comprising: receiving from a server summary analytics relating to phone calls made by a user with third parties, the phone calls being at least one of outgoing phone calls and incoming phone calls made by the user; and displaying of the summary analytics on a screen of the user device. There may be provide a computer program comprising instructions such that when the computer program is executed on a computing device, the computing device is arranged to carry out any of the methods described above. There may be provided a non-transitory computer-readable storage medium storing a computer program as described above.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

Some examples of embodiments of the present disclosure are concerned with making a phone call an actionable object. The actionable object concerning the phone call may be represented by for example an icon or the like on a graphical user interface (GUI) displayed on a display screen of a computing device. Having a phone call as an actionable object provides for a functionality in relation to the phone call that is not available from simple basic records or databases of details of the phone call. For example, having a phone call as an actionable object enables specific user actions and/or reminders or notes or comments or the like to be associated with the call, which for example enables a user to take some action in relation to the call or in relation to the person called by or who called the user. This in some examples enables the user to share specific user actions and/or reminders or notes or comments relating to the call with other users. Some examples of embodiments of the present disclosure are concerned with enabling summary analytics relating to phone calls made by a user with third parties to be displayed on a display screen of a user computing device. The summary analytics may be presented in for example a "dashboard" type format on the user computing device.

Figure 1:
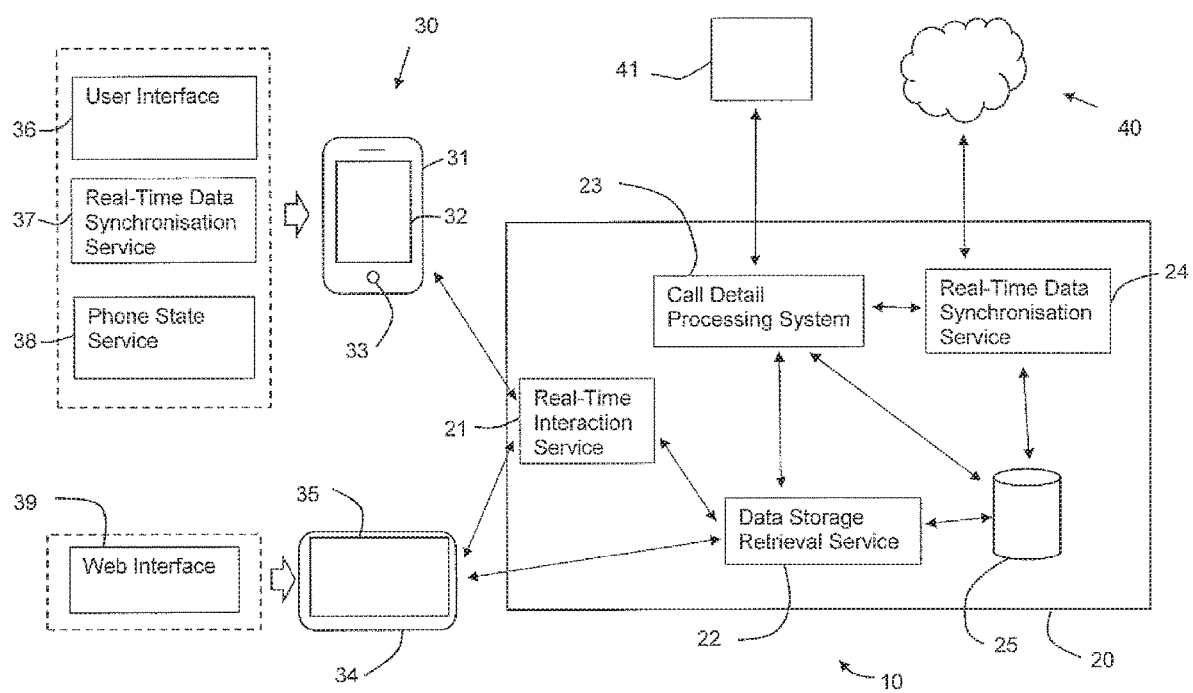
FIG. 1 shows schematically an overview of examples of components of a system according to the present disclosure and the flow of data between the components.

FIG. 1 shows schematically an overview of examples of components of a system 10 according to the present disclosure and the flow of data between the components. The system 10 has a centralised "back-end" server-based computer apparatus 20 and one or more "front-end" access points 30. Also shown are various external sources of inputs, data, services and Web-based applications 40, which will be discussed further below.

An example of a front-end access point 30 is a phone device 31, which is capable of making and receiving phone calls, which may be mobile/cellular and/or landline/fixed line calls. The phone device 31 has a processor and data storage, with appropriate software, etc., to enable it to function as described. The phone device 31 has a display screen 32 and one or more user input interfaces to enable a user to interact with the phone device 31. The user input interfaces may include for example one or more buttons 33. Alternatively or additionally, the display screen 32 may be a touchscreen which enables a user to interact with the phone device 31. The phone device 31 is capable of at least transmitting data to the server-based computer apparatus 20, over for example a cellular network and/or the Internet. The phone device 31 may also be capable of receiving data from the server-based computer apparatus 20. The phone device 31 may be for example a touchscreen smart phone which has a graphical user interface (GUI) displayed on the screen 32.

Another example of a front-end access point 30 is a user computing device 34 which has a display screen 35 having a graphical user interface (GUI) displayed thereon. The user computing device 34 has a processor and data storage, with appropriate software, etc., to enable it to function as described. The user computing device 34 has one or more user input interfaces to enable a user to interact with the user computing device 34. The user input interfaces may include for example one or more buttons, a trackpad, a connected mouse, etc. Alternatively or additionally, the display screen 35 may be a touchscreen which enables a user to interact with the user computing device 34. The user computing device 34 is capable of at least receiving data from the server-based computer apparatus 20, over for example the Internet and/or a cellular network in the case that the user computing device 34 is capable of cellular network communications. The user computing device 34 may also be capable of transmitting data to the server-based computer apparatus 20. The user computing device 34 may be for example a desktop or laptop or tablet computer.

In the present specification, the phone device 31 is typically described as an example of a front-end access point 30 for the purpose of making and receiving calls and sending data concerning the calls to the server-based computer apparatus 20. Likewise, the user computing device 34 is typically described as an example of a front-end access point 30 for the purpose of displaying summary analytics relating to phone calls made by the user, in for example a dashboard type format. One or both of the phone device 31 and the user computing device 34 may present a phone call as an actionable object, represented by for example an icon or the like on a graphical user interface (GUI) displayed on the display screen of the phone device 31 and the user computing device 34. This is considered to be a convenient and efficient arrangement for users: a phone device 31, such as for example a smartphone, is used to make calls and to send data concerning calls to the server-based computer apparatus 20, and, in some examples, to present a phone call as an actionable object on a display screen 32 of the phone device 31; whereas a user computing device 34, such as for example a desktop or laptop or tablet computer which typically has a larger screen and greater processing power, may be used by the user for viewing summary analytics relating to calls, and, in some examples, to present a phone call as an actionable object on a display screen 35 of the user computing device 34. However, it will be understood that in some examples, a single device may be provided with all of this functionality.

An overview of various components of the examples of devices and apparatus will now be given. A detailed discussion of the operation of certain aspects of the example components will then follow.

In this example, the server-based computer apparatus 20 has a real-time interaction service 21, a data storage retrieval service 22, a call detail processing system 23 and an external integration service 24, each of which may be implemented by for example software running on the processor of the server-based computer apparatus 20. The server-based computer apparatus 20 also has a data storage system 25 for storing data.

In this example, the phone device 31 has a user interface 36, a real-time data synchronisation service 37 and a phone state service 38, each of which may be implemented by for example software running on the processor of the phone device 31. This software may be for example a specific application for making a phone call an actionable object on the phone device 31 or some other device of the user, such as the user computing device 34. An example of such a smartphone application in the IOVOX™ application by IOVOX Ltd., applicant and assignee of the present application.

In this example, the user computing device 34 has a Web interface 39 which in this example provides a dashboard and which may be implemented by for example software running on the processor of the user computing device 34.

Both the phone device 31 and the user computing device 34 are arranged so that in order to access the functionality described herein, the user is first required to register with the server-based computer apparatus 20. The user may use for example some unique identifier (e.g. an email address for the user) in combination with a password or the like. The user is then required to enter their registered login details to the phone device 31 and/or the user computing device 34 to access the functionality of the application running on the phone device 31 and/or the user computing device 34.

Moreover, the user may register just one phone device 31 say or just one user computing device 34 say, or may register plural phone devices 31 and/or plural user computing devices 34. As those plural phone devices 31 and/or plural user computing devices 34 are all registered to the same user, and obtain the data discussed herein from the same source (the server-based computer apparatus 20, as discussed further below), this ensures that all of the user's registered devices are effectively synchronised in relation to the data concerning the calls made, etc.

The real-time data synchronisation service 37 on the phone device 31 passes data from the phone device 31 to the server-based computer apparatus 20 and passes information from the server-based computer apparatus 20 to the phone device 31. The phone state service 38 logs at least some events relating to phone calls that take place on the phone device 31 and transmits to the server-based computer apparatus 20 at least some information regarding the ingoing and outgoing call events that occur on the phone device 31.

The real-time interaction service 21 on the server-based computer apparatus 20 passes data between the phone device 31, the user computing device 34 and the data storage retrieval service 22 of the server-based computer apparatus 20. The data storage retrieval service 22 on the server-based computer apparatus 20 passes data between the real-time interaction service 21 and the data storage system 25 on the server-based computer apparatus 20. The data storage retrieval service 22 is also able to send data to the call detail processing system 23 on the server-based computer apparatus 20. Also, in this example, the data storage retrieval service 22 is able to send data to and receive data from the Web interface 39 on the user computing device 34. In addition, in some examples, the data storage retrieval service 22 is able to interact with and receive data from a source 41 of data relating to calls, which is separate from the phone device 31 itself and which may be Internet or "cloud" based. The call detail processing system 23 processes such data received from the source 41 and passes it to the a data storage system 25 of the server-based computer apparatus 20 for storage. The call detail processing system 23 may also pass the processed data to the external integration service 24 in some examples.

An important aspect of making a telephone call an actionable object is obtaining data (or metadata) relating to the call in the first place. This is not trivial, especially for some particular phone systems. In the case of for example an email which has been sent from one user to another, the email itself already contains the data that is necessary to make an email an actionable object. For example, the email itself already includes at least an (email) address for the sender, an (email) address for the recipient, and the date of transmission and/or receipt of the email, and that data can easily be extracted automatically by a computer running appropriate software. In contrast, a phone call in a sense is just the speaking of words from one user to another. The phone call itself has no record of for example when it was made and who the caller and callee were. As another example, with emails, there is typically some server that handles the sending and receiving of emails. Data concerning the emails may be stored on the email server and is accessible to a computer running appropriate software. In contrast, there is in at least most cases no equivalent "phone call server".

It is therefore necessary to obtain the data relating to the call from one or more other sources. Moreover, that data needs to be stored somewhere. The use of the server-based computer apparatus 20 described herein enables data relating to the call to be obtained and also makes that data available to one or more front-end access points 30 (which may be phone devices 31 and/or user computing devices 34, as discussed above).

The detailed steps necessary for the server-based computer apparatus 20 to obtain data relating to a phone call will typically vary depending on the phone system being used by the user to make or receive the call. A number of specific examples will be described. In the following description of the examples, reference will be made to FIGS. 2 and 3, which show block diagrams for the steps that are undertaken. In practice, the steps will be carried out under control of software (an application or "app") running on the phone device 31 used by the user for the call concerned.

Figure 2:
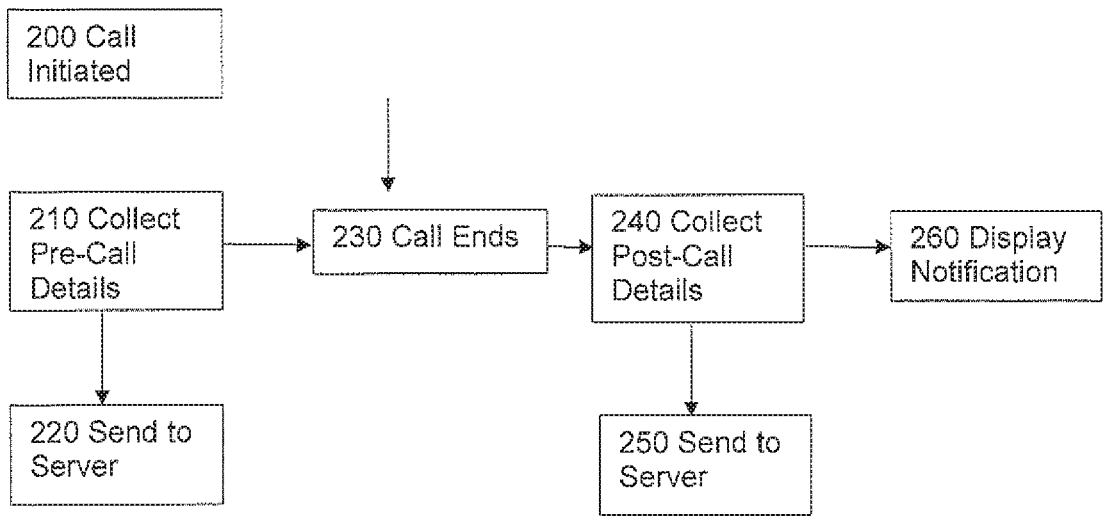
FIG. 2 shows schematically a first example of a method for obtaining call data.

Referring to FIG. 2, in a first example, at 200 the software running on the phone device 31 notes that a call has been initiated. The call may be an incoming call or an outgoing call. At 210, pre-call details are collected. The pre-call details may include one or more of the telephone number of the caller (whether the call is an incoming call or an outgoing call), the phone number of the callee (whether the call is an incoming or an outgoing call) and the start time of the call. At 220, the pre-call details are sent to the server-based computer apparatus 20.

At 230, the software running on the phone device 31 notes that the call has ended. At 240, post-call details are collected from the phone device 31. The post-call details include at least the end time of the call. The post-call details may also include one or more of an email address of the person calling the phone device 31 or called by the phone device 31, the picture of that person and the location of that person at the time the call was made. At 250, the post-call details are sent to the server-based computer apparatus 20. At 260, a notification relating to the call is displayed on the phone device 31.

It may be noted that a missed call may also be treated as a completed call, such the data relating to missed calls is also sent to the server-based computer apparatus 20.

In the example described with reference to FIG. 2, all of the necessary call details are (readily) available from the phone device 31 itself. For example, there may be an API (Application Programming Interface) that specifically stores call details and makes them available to other applications running the phone device 31 (for other purposes). An example of such a system is provided by the Android operating system for phones by Google.

Figure 3:
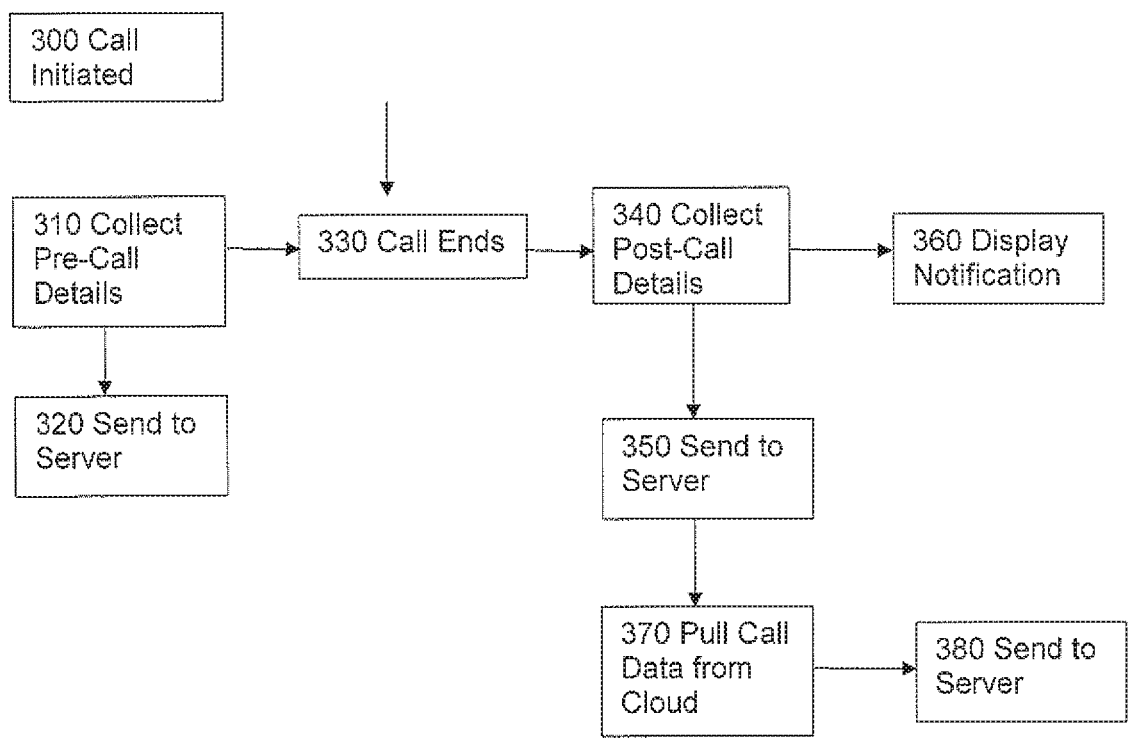
FIG. 3 shows schematically a second example of a method for obtaining call data.

Referring to FIG. 3, in a second example, not all call details are (readily) available from the phone device 31). Accordingly, additional steps are required in such cases.

So, referring to FIG. 3, the software or application running on the phone device 31 notes that 300 that a call has been initiated. At 310, pre-call details are collected. In this case, the pre-call details may only be a start time of the call as that may be the only the information concerning the call that is available from the phone device 31 at this point in time. At 320, the pre-call details are sent to the server-based computer apparatus 20.

At 330, the call ends. At 340, post-call details are collected. Again, in this example, it may be that the only post-call detail that can be collected from the phone device 31 is the end time of the call. At 350, the post-call details are sent to the server-based computer apparatus 20. In addition, at 360 a notification concerning the call is displayed on the phone device 31.

At this point, the server-based computer apparatus 20 still needs to obtain further details concerning the call, including for example the phone number of the person calling the phone device 31 or called by the phone device 31, the name, email address, picture, and location of that person. The server-based computer apparatus 20 obtains the further call data from a remote third party server that stores call history data for the phone device. Such third party remote servers for storing call history data are provided with some systems particularly to enable a user to register a number of devices with the third party server and for the user's call history to be synchronised across the various devices. An example of such a system is the iOS system by Apple which stores call history data in the so-called "iCloud".

Accordingly, in this example, at 370 call data is accessed from the remote or "cloud" storage. This may require some "fuzzy" matching of data in order to access the correct call history data for the particular phone call concerned. For example, there may be minor differences in the initiation or end times of the call as noted by the phone device 31 itself and as stored in the remote or cloud server. The call history data that is obtained from the cloud server may include one or more of the phone number, name, email address, picture and location of the person calling the phone device 31 or called by the phone device 31. At 380, that further call data is sent to the server-based computer apparatus 20.

In the example, illustrated in FIG. 3, where the server needs to access some third party server or cloud storage in order to obtain further call data, permission may be required from the user of the phone device 31. For this, the user may log in to their account with the third party server that stores call history data for the user, in effect to register the application running on the phone device 31. The third party server may for example pass a security token to the application running on the phone device 31, which is then used by the server-based computer apparatus 20 to access the cloud storage.

In another example, the call may be made using a PBX (private branch exchange) or a cloud-based voice-over-internet-protocol (VOIP) communications service (e.g., BroadSoft). A PBX is a telephone system, typically within an organisation, that switches calls between organisation users on local lines while allowing all users to share a certain number of external phone lines. Cloud-based VOIP communications services provide voice, video, web conferencing telecommunication services over packet-switched data networks. In either case, the necessary call data may be obtained from a database or the like which is maintained by the computer(s) operating the PBX or VOIP service, and such calls can be made into actionable objects. The ability to collect and action on calls from a PBX or VOIP system can be provided as a connector to the service.

Figure 4:
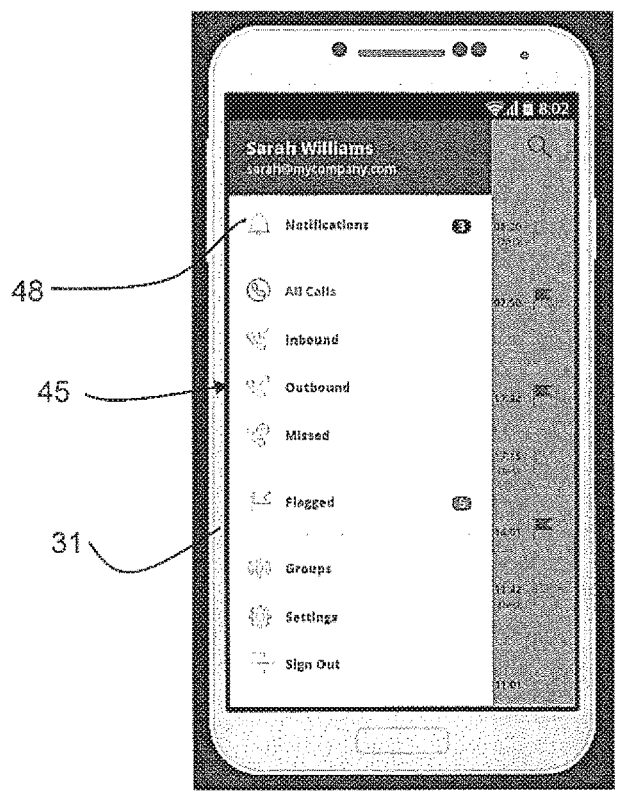
FIG. 4 shows a first example of a display on a user device.

In any case, at this point a notification is now displayed on the phone device 31. An example of a screen of the user interface 45 provided by the application running on a phone device 31 is shown in FIG. 4. An indication 48 of notifications is presented by the user interface. The user can select the notifications, for example by tapping on the notification in the case that the phone device 31 has a touch screen or by use of some other operating button or the like.

Figure 5:
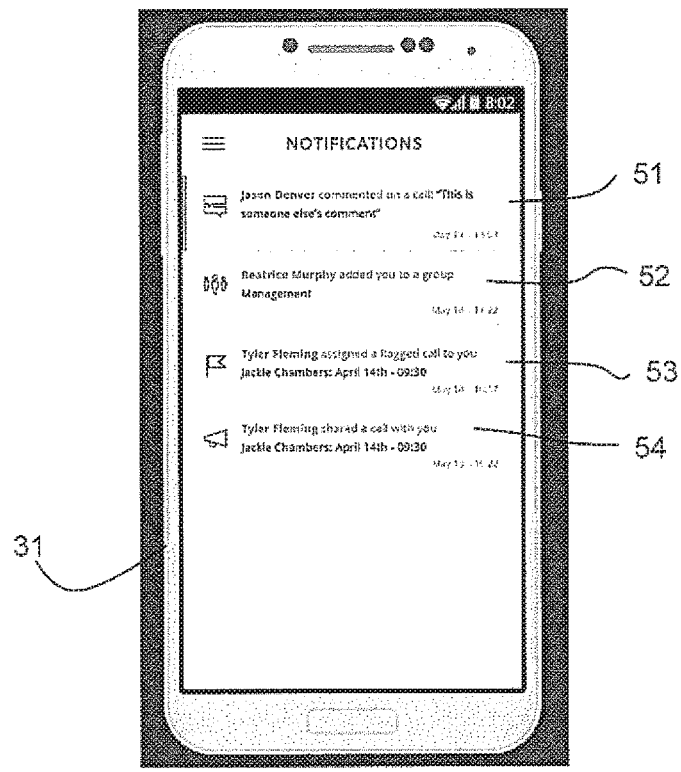
FIG. 5 shows an example of display of notifications on a user device.

Examples of notifications are illustrated schematically in FIG. 5. A first notification 51 notifies the user that another specified user has commented on a call. That is, the other user has added a comment to the call data, which is then sent to the server-based computer apparatus 20. The server-based computer apparatus 20 then updates the actionable object relating to the call that is on all other phone devices 31 or other computing devices with which the call has been shared. ("Sharing" of the call is discussed further below.)

The comments feature enables users who share metadata for a call to transmit a message in the form of text to a thread associated with the call. This message is accessible to every user shared in that call. In one example, the date and time of the comment publication is captured and stored in the data storage system 25 and appears alongside the comment in the thread displayed on the user's phone device 31 or other user computing device 34. In an example, for a given user, a comment made on any of the calls shared with them prompts a notification on their device(s).

A second notification 52 indicates that the user of the phone device 31 has been added to a group, in this example, a "management" group. A third notification 53 is that another user has assigned a flagged call to the user of the phone device 31. (Flagging of calls will be discussed further below.) Last, in this example, a fourth notification is that another user has shared a call with the user of the phone device 31.

Having selected the displayed notification, the user can then select the phone call which is presented as an actionable object. An example of the display of the phone call as an actionable object is given in FIG. 6. The key point about the phone call being an actionable object, which here is presented on a screen of the phone device 31, is that the user can immediately select actions to be carried out in respect of the phone call. A number of examples of the actions that are available or possible will be discussed below. Moreover, as a result of treating phone calls as actionable objects, the calls and the metadata associated with those calls is more easily stored, organised, searched, shared and otherwise manipulated by the user. Again, examples of this will be discussed further below. This functionality leads to better call management, which is useful for personal users and also of significant value to business users.

Figure 6:
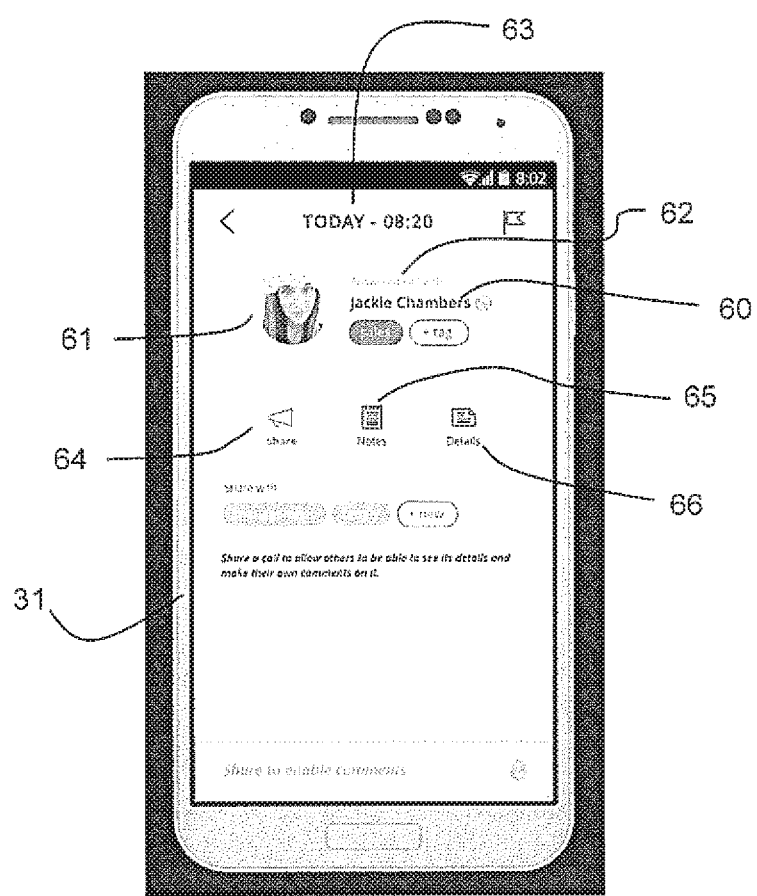
FIG. 6 shows an example of the display of a phone call as an actionable object.

It will be appreciated that the information and options that are presented in the user interface on the phone device 31, as indicated in the example of FIG. 6, are provided by the sever-based computer apparatus 20, which, as described above, has been sent or has otherwise obtained the call data. This call data may be provided from the server-based computer apparatus 20 to the phone device 31 rapidly after the call has been terminated. In that way, the user is presented with the phone call as an actionable object practically as soon or at least very soon after the call has been terminated. This is convenient for the user. This also encourages the user to take further action in respect of the phone call promptly. Also, at the option of the user, the server-based computer apparatus 20 may alternatively or additionally provide the call data to another of the user's devices, such as another phone device of the user or a user computing device 34 as described above. Another advantage of the call data being saved on the server-based computing apparatus 20 is that the data can effectively be saved permanently, effectively providing an unlimited call history. In contrast, typical cellular or mobile phones only store call history data for 30 days. An unlimited call history archive can be a premium feature set of the service that provides a user unlimited call data storage for a small fee.

The call history archive can be exported. Users of the service can export their call history archive by day, week, month or any custom selected date range. A user's ability to export data from the call history archive can be tiered according to a subscription level to which the user subscribes. For example, users at the free subscription level can export the 30 days that are stored for free, while users at a premium paid subscription level can export all data that is stored within their account.

Furthermore, the actionable object relating to the phone call and the information and options which are described herein as being presented in the user interface on the phone device 31 may alternatively or additionally be caused to be displayed on some other front-end access point 30, such as a user computing device 34. This may be brought about by the server-based computing apparatus 20 sending the necessary data and instructions to the other front-end access point 30, such as a user computing device 34, and a similar application on the other front-end access point 30 presenting the phone call as an actionable object on a display of the other front-end access point 30. For convenience and brevity, much of the description here is given in terms of the actionable object relating to the phone call being presented on a phone device 31, it being understood that this typically applies equally to the actionable object relating to the phone call being presented on some other user computing device 34 (unless the context requires otherwise).

Returning now to FIG. 6, when the phone call is displayed as an actionable object on the phone device 31 (or other user computing device 34), in this example the name 60 and picture 61 of the person who called the phone device 31 or was called by the phone device 31 is presented. At 62, it is also indicated whether the call was incoming or an outgoing call. The date and time of the call may also be indicated at 63.

In this specific example, three items for action are also presented. The first is an option to share 64 details of the call with others. The second option is to add notes 65 which are then associated with the phone call. A third option is to view further details 66 relating to the phone call and/or the person who was called or was calling. Other options, such as to add comments, may be provided. In this regard, in the present example, notes added by a user are always private and so are not shared with other users. On the other hand, comments added by a user will be shared with other users or may be shared with other users at the option of the user.

In the instance of the user interface illustrated in FIG. 6, the share option 64 has been selected. This in turn leads to a number of sub-options. In this case, the sub-options are the ability to share with all members of a group to which the user of the phone device 31 has subscribed or has joined. This group may be for example "management" of an organisation, or "family" of the user, etc. An important point to make here is that if the user decides to share the call with another user, or add notes or comments to the call, etc., information concerning that is stored at the server-based computer apparatus 20, which can then share the call data (or at least some of the call data) with the other nominated users, add notes to its own record of the call so that the notes are available to other registered devices of the user, etc. Likewise, the membership of the groups, such as "management", is stored is by the server-based computer apparatus 20 which can then share the call data with those other nominated users. That is, in short, the server-based computer apparatus 20 stores and controls dissemination of the call history, which enables multi-user access to the call data as well enabling a particular user to access the call data from a number of different devices.

As mentioned, sharing is the ability to pass on information relating to a call to for example a contact of the user or a plurality of contacts. In the case of sharing the call information with a plurality of contacts, the contacts can be identified and selected one-by-one by the user, for example by the user going through a contacts list or the like on their phone device 31 or other user computing device 34. Alternatively or additionally, as mentioned, the contacts with whom the call is to be shared may all be part of a group, and the user simply selects that group so as to result in the call data being shared with all members of that group. In the case that those recipients of the shared call information have a device with the same functionality provided by the application described herein, the shared call data can be passed directly by the server-based computer apparatus 20 to that other user's device; the other user's device can then present the call data as an actionable object for that other user. Alternatively, if the recipient user does not have a device with the current functionality, the shared information may be sent by for example email to that other user. As an option, the user of the phone device 31 or other user computing device 34 who is sharing the call data with other users may restrict the access so that the other users cannot further share the call data with other users. This may be an option that is provided on the phone device 31 or other user computing device 34 and which is recorded in relation to that option by the server-based computer apparatus 20.

If the user selects the option to add notes 65, the user is then provided with the functionality to add free text notes which are then associated with and presented for display with the call data. The user can type in the notes, using a user interface on the phone device 31 or other user computing device 34. As an option, based on the frequency of use of particular text strings entered into the notes of calls, the application on the phone device 31 or other user computing device 34 offers frequently used notes to the user, listed in order of their past usage. In one example, the notes are private: they are sent to and synchronised with the server-based computer apparatus 20 and other devices linked to the same user, but they are not transferred to other users if the call is shared with other users.

Another option that may be made available to the user, by for example clicking on an icon or button associated with a call or a particular contact, is to add a tag. A tag in this context is a short, searchable string of text which is associated, both in the data storage system 25 of the server-based computer apparatus 20 and within the phone device 31 or other user computing device 34, with the call or contact to which the tag is being assigned. Multiple tags may be added for any call or contact. In an example, the tag selection causes a pop-up notification to appear on the phone device 31 or other user computing device 34, allowing the user to input a string of and to define a particular type or category of tag. Furthermore, the pop-up may provide a list of selectable previously-entered tags. In another example, it is possible to start a call with predefined tags. A user manually inputs the tags into the application running on the phone device 31 prior to the call. If the called party is also a user of the application running on the phone device 31 then, once a call is initiated, the tags are sent via the server-based computer apparatus 20 to the called party. Those predefined tags are also sent to the data storage system 25 of the server-based computer apparatus 20 and associated with that call event.

Tags are customizable and created by the user, for the user. Tags can be used for business or personal calls. These selected tags can then be automatically appended to the call the next time that number and/or contact calls the user. These tags can also be pre-appended to numbers purchased through a premium level feature set. When numbers purchased through a premium level feature set are used, tags can be pre-fixed to the call and displayed to not only that individual user and/or owner of the number, but also to all users of the service who make and/or receive calls from that number or contact.

Because the user's call history and any notes, tags or comments associated with the calls made to or from the user are stored, the user can freely search all this information on mobile or web with short or long-tail keywords.

As mentioned, the location of the user of the phone device 31 and/or the person calling or called by the user may be obtained and stored by the server-based computer apparatus 20. Various options for obtaining the location data are possible. For example, the location data may be obtained for example from the device on which the call was made. This may be by use of for example a GPS device on the device on which the call was made. Alternatively, in the case of the phone being a cellular phone, the location may be obtained by knowing the base station of a cellular phone system to which the phone device was connected at the time of the call. Alternatively, in the case of the phone being connected to a WiFi network at the time of the call, and details of the WiFi network being available, the location may be obtained by knowing the location of the WiFi network.

Knowing the location of the user and/or the person calling or called by the user enables further functionality to be provided by the actionable object relating to the call. Some examples will be discussed, it being understood that not all of these will be implemented in all cases.

One location-based aspect is geotagging and subsequent geographic mapping and display of a user's calls. In one example, the location of the user every time a phone call takes place is stored in the data storage system 25 of the server-based computer apparatus 20. When an ingoing, outgoing or missed call occurs, the location information is sent from the phone device 31 via the real-time interaction service 21, data storage retrieval service 22 and call detail processing system 23 to the data storage system 25. Other metadata relating to that call, such as the time of the call and the called party, is also stored, as described above. The application running on the phone device 31 or other user computing device 34 allows the user to view the locations of the calls made or answered within a given time period on a geographical map. In an example, the symbols or icons that illustrate the position of a call on the map are interactive and/or selectable.

Another location-based aspect is so called "smart notifications". In one example, the notifications are set up such that the location of the user's phone device 31 prompts a notification to be presented to the user if the phone device 31 is at a particular place. The notification communicates to the user phone call-related information that is relevant to that location. In one example, the notification acts as a reminder instructing the user that a phone call that may need to be made. In another example, the notification includes details of a past call that has been made. Dependent on what the user specifies, this could be the previous call made using the phone device 31 or the last call to a particular contact. As a specific example to illustrate this, once a user enters his/her office location, the details of the last call with his/her colleagues pops up as a notification on his/her phone device 31 or other user computing device 34.

Another location-based aspect is "auto-adding". In one example, a call is automatically initiated when the user's device's location corresponds to a pre-set location. As a specific example to illustrate this, when a user enters his/her home, a phone call is automatically initiated with his/her spouse, the user's parent, etc.

Another location-based aspect is automatic metadata association and suggestion. In an example, location information related to each user is stored in the data storage system 25. For example, at the user's option their work and home locations are stored. When a call is made, the metadata is analysed by the server-based computer apparatus 20 to infer whether the location of the user's phone device 31 matches a known location. If a match is found, a signal is sent to at least one of the calling parties. In one example, this influences or adds to the choices of selectable tags for that call. For example, if colleagues call each other from their respective workplaces, then the system may offer "work-related" as a tag during or after the call.

Yet another location-based aspect is location-based auto-forwarding of calls. The auto-forwarding is triggered at a place defined by the user. To implement this feature, in one example the application running on the phone device 31 determines when the phone device 31 is no longer within a certain predefined threshold distance of the place. The location of the phone device 31 may be obtained from the phone device 31 (e.g. by using GPS, or the location of the base station or WiFi, etc., as discussed above) at regular intervals by the phone state service 38. When the phone device 31 is no longer within a certain predefined threshold distance of the place, the application running on the phone device 31 automatically communicates with the operating system of the phone device 31 to change the call forwarding settings. Once the phone device 31 re-enters the place, the setting is switched back.

Another option that may be made available to the user, by for example clicking on an icon or button associated with a call or a particular contact, is "auto-prodding". This may be based on application and user history. In one example, if analysis of call metadata in the server-based computer apparatus 20 shows that a customer regularly makes a phone call to a specific contact at a certain time of day, the application running on the phone device 31 or other user computing device 34 analyses the calling history and, based on pre-set thresholds, determines whether the observed activity should prompt the auto-prod. If the criteria for an auto-prod is satisfied, and the event has not occurred as expected based on the historical user behaviour, the server-based computer apparatus 20 sends a message to the phone device 31 or other user computing device 34 prompting a notification to the user reminding him/her of the activity which normally occurs. In another example, the auto-prod feature interfaces with another application, such as a calendar application running on the phone device 31 or other user computing device 34, via an API to instruct a reminder calendar entry to be created.

In another option that may be made available to the user, a clickable, touchable, or otherwise user-selectable icon or button is positioned to correspond to a particular phone call on the phone device 31 or other user computing device 34 to give the user the option to flag the call on the user's device. This action by the user prompts phone device 31 or other user computing device 34 to transmit a signal defining the flagging or unflagging of the call to the real-time interaction service 21 which then passes that signal on to the data storage retrieval service 22. The data storage retrieval service 22 queries the database in the data storage system 25 to find the corresponding call that has been flagged and translates the signal that it has received into a database entry. In parallel, the application running on the phone device 31 or other user computing device 34 is updated by means of a signal sent from the real-time interactive service 21. The user action to flag a call also prompts a change in the displayed information indicating that the flag has been set or removed. This may be by for example changing the flag image colour from white, indicating a flag has not been set, to a red flag, indicating that the call corresponding to that flag has been flagged or vice versa.

The flags themselves may be caused to be actionable objects for which reminders and due dates can be added. Flags can be shared and assigned. Once a flag has been ascribed to a call, flag details can also be entered by the user. Once that information has been submitted, the data regarding the flag is sent to the data storage system 25 via the real-time interactive service 21 and the data storage retrieval service 22.

If a reminder has been set, it is possible to specify the type of reminder, such as an email and/or a push notification. The time of that reminder can be set and a message included. If an email reminder is set, the centralised real-time interaction service 21 sends an email to the user's unique identifier email address at the specified time. If a push notification is requested then, at the time of the reminder, the application running on the phone device 31 or other user computing device 34 prompts a notification with relevant flagged reminder information to be displayed on the display of the phone device 31 or other user computing device 34.

An option relating to the flagging aspect that may be made available to the user is the ability to assign the flag to another contact. In one example, once the flag is submitted, then if an assignment of a call to another contact has been made, a signal is sent from the phone device 31 or other user computing device 34 to the real-time interaction service 21. This causes the real-time interaction service 21 to find, using the data storage retrieval service 22, the data corresponding to the call being assigned in the data storage system 25. This data is then copied to and thereby associated with the contact's account. The same information is then relayed to the contact's devices so that they are stored locally. While this occurs, a message is sent from the user's phone device 31 or other user computing device 34 to the contact's device(s) via the server-based computer apparatus 20, which prompts a notification in the contact's device(s) stating that the call has been assigned to them.

Figure 7:
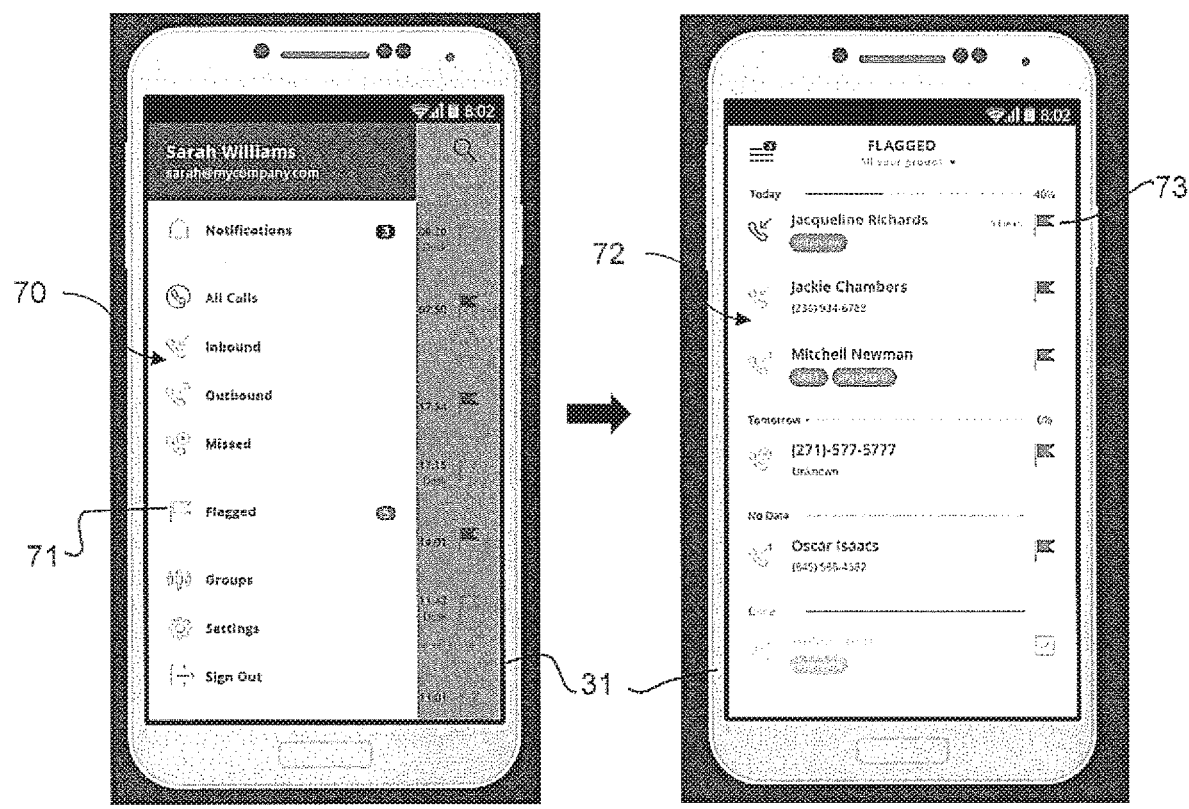
FIG. 7 shows an example of the display of flags.

An option relating to the flagging aspect that may be made available is the ability to view only those calls that have been flagged. The calls whose metadata indicates that the flag has been set may be displayed in a list view. An example of the use of flags on a user device such as the phone device 31 is illustrated in FIG. 7. In the left hand side of the figure (which is the same as FIG. 4 discussed above), a summary list view 70 of inter alia calls is displayed on the phone device 31. The calls may be displayed with options to select for example "All Calls", "Inbound" calls, "Outbound" calls and "Missed" calls. In addition, an option 71 to select "Flagged" calls may be presented. The right hand side of the figure shows the display on the phone device 31 after the option to display a list of the Flagged calls has been selected. A summary 72 of the calls, including for example the date of the call and the name and phone number of the person called or calling, is displayed. Against the calls, an icon 73 representing the flag is displayed.

In an example, details of the flagged calls are stored locally on the phone device 31 or other user computing device 34, as well as in the server-based computer apparatus 20, such that the creation of this list does not require data to be transmitted to or from the data storage system 25. Instead, the list can be extracted from the internal, local storage of the phone device 31 or other user computing device 34. In an alternative arrangement, the flagged calls and associated metadata are not stored locally or only a subset of the flagged calls and associated metadata are stored locally. In this example, creation of the list would require information retrieval from the data storage system 25.

In another option that may be made available to the user, an ability to block "spam" calls may be provided. (A spam call is typically a call from someone not known to the user and who is offering services or products to the user, even though the user has not requested such offers.) Two examples of ways in which a spammer may be listed as spam, and hence, blocked will be described.

In a first example, the user has the option to manually classify the caller as spam through an action on the phone call. This user action is picked up by the real-time interaction service 21 which relays it to the data storage system 25, which in turn keeps a record of the spam indicators for each phone number indicated by the user as being used by a spam caller.

Figure 8:
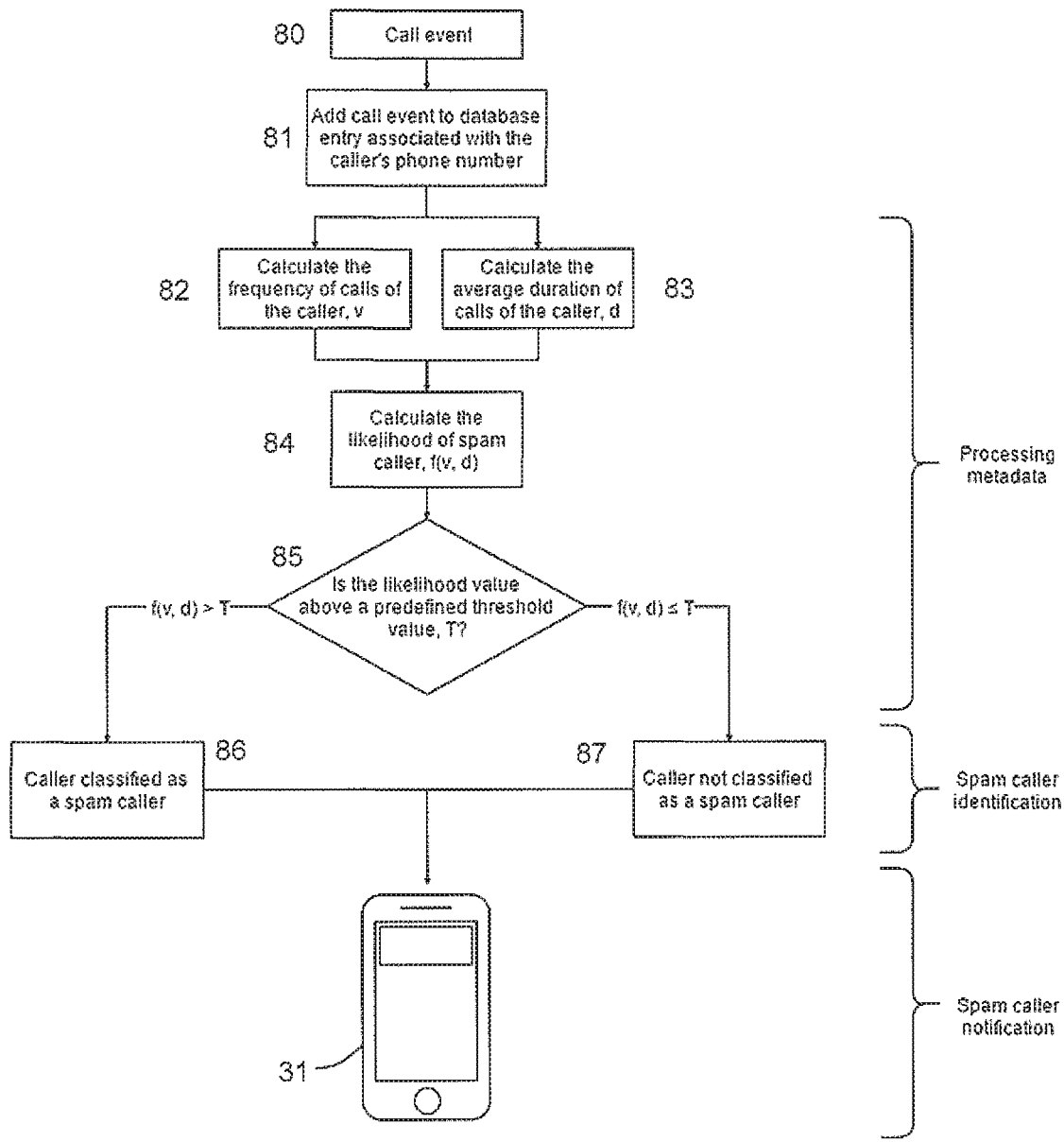
FIG. 8 shows schematically an example of a method for classifying phone numbers as spam caller numbers.

In a second example, which may be provided in addition or as an alternative to the first example, every phone number has a respective classification as either spam or not. Each classification is continually, automatically updated as the call records evolve. An example of a process for this as carried out by the server-based computer apparatus 20 is illustrated schematically in FIG. 8. When a call event occurs 80, the call event is added to the database entry associated with the caller's phone number 81. The classification as spam or not is based on a quantitative analysis of the call metadata associated with that phone number. In this example, a function of the frequency of calls 82 and the (average) duration of the calls 83 involving the caller is used to obtain the likelihood value 84 that the caller is a spam caller. The likelihood value may compared 85 with a threshold to decide whether the caller is a spam caller 86 or not a spam caller 87. In the case that the caller has been identified as a spam caller, a message is sent from server-based computer apparatus 20 to the phone device 31 or other user computing device 34, which prompts the device to pop up a notification alerting the user that the caller is a spam caller. This may occur either before, during or after a call is made. In a further example, the notification is actionable; it could prompt the application to, for example, delete the call event, end the call, dismiss the call, flag or tag the call or interact with a spam blocking application on the phone device 31 or other user computing device 34 via an API.

In accordance with this example, the classifications of the callers as spam callers or not are stored in the centralised data storage system 25 and associated with each phone number. As a consequence, the classifications are shared with all users and hence spammers are more quickly identified and blocked across all users.

In another option that may be made available to the user, in addition to or instead of the ability to flag of calls, the user may be able to specify an importance rating to the call. For example, before, during or after a call, a user can specify, using a numbered or other scale, the importance of that call using the user interface of the phone device 31 or other user computing device 34. This rating is sent via data transmission to the data storage system 25 of the server-based computer apparatus 20, which records the rating and associates it with the relevant call. The call importance rating can be used to prioritise calls; for example to order them so that the most important calls are displayed at the top of the list displayed on the phone device 31 or other user computing device 34. In an alternative, instead of a list of discrete values or a range of options for defining the importance of a call, a single symbol or icon, such as an exclamation mark or the like, may be used. This can also be performed automatically based on the caller's rating across the whole user network.

In another option that may be made available to the user, the user may be able to specify a call quality rating. For example, if the called party is a business, the user can provide a quality rating after the call is completed based on the user's satisfaction with the call. The ratings can be published online to create a ratings model, such as a five-star ratings model, that other users can use to make decisions on which business to patronize. Alternatively, instead of being published, the ratings can be provided to the business as a premium, paid-tier service that the business can use to analyze and improve its customer service.

Various external sources of inputs, data, services and Web-based applications 40 are indicated schematically in FIG. 1. These may include for example CRM (Customer Relationship Management), ERP (Enterprise Resource Planning) and other collaboration and workflow software. The external integration service 24 may manage the interaction of the server-based computer apparatus 20 with these other sources 40. This enables users to obtain data from and pass data concerning phone calls to these other sources 40 in a consistent manner. Other sources 40 can include, but are not limited to, CRM platforms such as Zoho, Salesforce, Dynamics, HubSpot, Prosperworks, Chime, and the link. Other sources 40 can be used with the service to share call data directly into the platform and keep the CRM up to date. This feature can be automatic, where all calls are shared, or selective, where the user selects the individual call or contacts he/she would like shared with the CRM. In addition to the call details that are shared, users can also share tags, comments and flags with their CRM as well as push notes and changes back from the CRM into the service. External integration service 24 can be provided as a premium, paid-tier service.

In another option that may be made available to the user, the service can provide call recording. Users can choose to selectively or automatically record their calls based on contact, phone number, time of day, destination, location, etc. In one embodiment, only one user's side of the conversation is recorded. However, if both users are calling each other using the service (e.g., both users are using the service's mobile app), then the service can individually record both sides and merge the two individual recordings together into one playable, downloadable and shareable recording file, such as an MP3 file, of the entire phone call including both sides of the conversation. That is, when both parties have the call recording service enabled, both sides of the conversation can be stitched together into one recording file accessible to both parties on the call.

In another option that may be made available to the user, the service can provide call transcriptions. If a user or users choose to record a call, they can then selectively or automatically transcribe the recording. In one embodiment, the call transcription service is a Node.js microservice that integrates with Microsoft's Bing speech API to transcribe call recordings. The call transcription is displayed within the service for the user to read, search and share according to their preference.

In another option that may be made available to the user, the service can respond to voice commands from the user. Users can create custom tags, notes and comments before, during or after a call through a series of custom voice commands that are recognized by the service. For example, a user can speak "iovox take note" followed by the content of the note, tag, comment (e.g., "iovox take note, follow up with Jen").

In another option that may be made available to the user, the service can provide a smart dialer. The smart dialer can provide caller suggestions, call context and additional functionality to enhance the overall calling experience. The smart dialer can use machine learning to improve the suggestions it makes to the user. The smart dialer can be provided as an "in-app" dialer within a smartphone application associated with the service.

In another option that may be made available to the user, the service can provide a feature that indicates which of the user's contacts are enabled users of the service and provides information relating to their availability to receive a call via the service ("call presence"). The user-based features enabled for a connection between two users of the service include information such as availability, location, time-zone, calendar, if they are on a call and more. This feature set triggers product virality as it encourages the user to get their contacts on the service for added context on where the user is, if they are available, the best time to call them, the last time they connected and more. If both parties are using the app, users could identify whether an incoming call was urgent.

In much of the above, little distinction is made between what can be displayed on a phone device 31 or a user computing device 34 in relation to the data and options relating to phone calls and phone calls as actionable items. Many phone devices are of course so-called "smart phones", with relatively high power processors and the like. However, typically a user computing device, such as a desktop or laptop or tablet computer or the like, has a much larger display screen. In some examples, therefore, use may be made of this to display summary analytics relating to phone calls made by the user in for example a dashboard type format on a user computing device.

Figure 9:
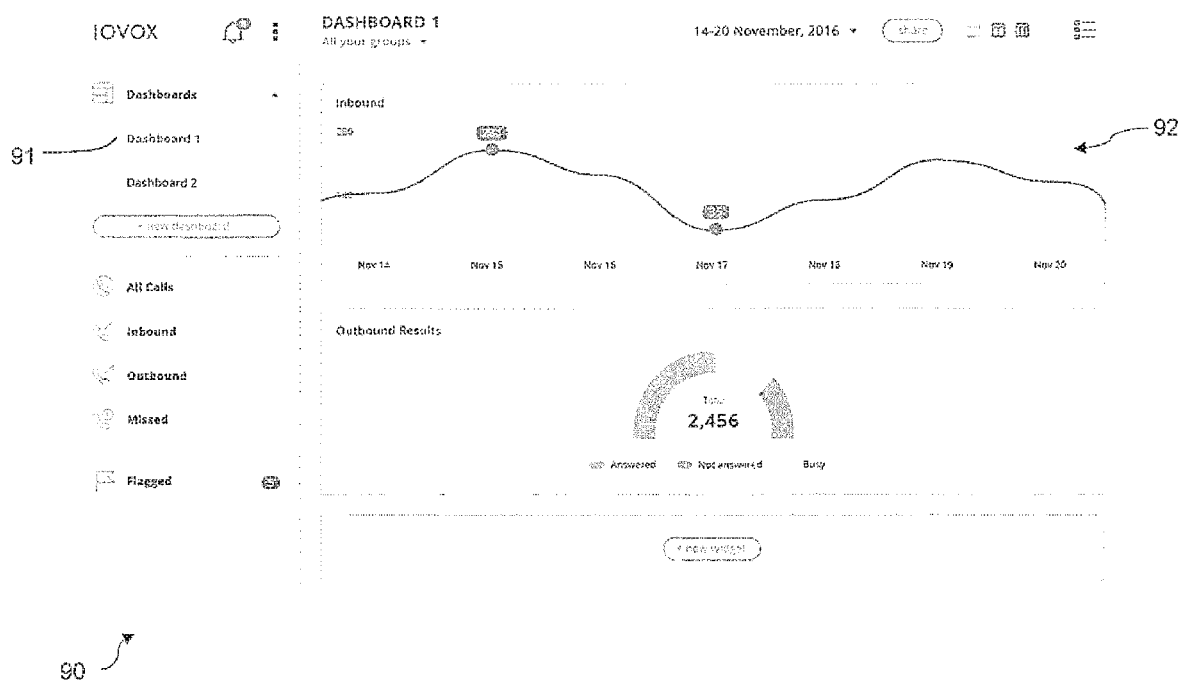
FIG. 9 shows an example of a dashboard display.

An example of a dashboard 90 for displaying summary analytics and the like is shown in FIG. 9. An option 91 to select display of the dashboard 90 is provided. In this example, the dashboard 90 comprises at least a section 92 on the user's call analytics. Statistics and visualisations of the historical call metadata are available in real-time. The metadata is processed in the server-based computer apparatus 20 and passed to the user computing device 34 for display in the dashboard 90. Each incoming and outgoing phone call triggers a change in the user's metadata. The call detail processing system 23 recognises this change as it updates the data in the data storage system 25 and updates the summary analytics which are then transmitted via the real-time interaction service 24 to the dashboard 90 on the user computing device 34. Because the user's one or more phone devices 31 and one or more user computing devices 34 are all registered to the same user, and obtain the data discussed herein from the same source (i.e. the server-based computer apparatus 20), this ensures that all of the user's registered devices are effectively synchronised in relation to the data concerning the calls made, etc.

In an example, the call analytics section 92 provides a visual representation of metadata such as, but not limited to, numbers of calls made in a set period of time, type of call (ingoing, outgoing and missed), dates and times of the calls, locations of the calls and topics of the calls. These output representations may be customisable on the interface of the dashboard 90.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Reference is made herein to data storage for storing data. This may be provided by a single device or by plural devices. Suitable devices include for example a hard disk and non-volatile semiconductor memory. Similarly, reference to a server should be taken to include reference to plural servers, across which data and/or functionality may be distributed, unless the context requires otherwise.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

Although the present invention and its advantages have been described in detail, it should be understood that various changes, substitutions and alterations can be made herein without departing from the scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. A computer apparatus providing a back-end server function to enable phone calls to be actionable objects on a user device, the computer apparatus comprising:
   a processor and data storage;
   the data storage being arranged to store data relating to phone calls between a user with third parties;
   the processor and data storage being constructed and arranged to:
      receive data from an app running on the user device, the data relating to a phone call being made or received or having been made or received by a user with a third party;
      add the data to the data storage, the phone call being at least one of an outgoing phone call and an incoming phone call;
      query a remote third party database outside of the computer apparatus to obtain data relating to the phone call including requiring a user to log into his account with a third party server hosting the third party database;
      adding the data obtained from the third party database to the data storage; and
      transmit to the user device data from the data storage relating to the phone call made or received by the user with the third party, the transmitted data enabling the user device to create or update an actionable object relating to the call with the third party on the user device
      wherein call data from the user device is sent to the computer apparatus providing a back-end server function and stored in the data storage, call data from a remote third party database is stored in the data storage, and call data from the data storage is transmitted to the user device enabling the user device to create or update an actionable item.

2. The computer apparatus according to claim 1, the processor and data storage being arranged to receive data relating to the location of the user when the call was made and to update data in the data storage relating to phone calls made by the user in accordance with the received location data.

3. The computer apparatus according to claim 1, the processor and data storage being constructed and arranged to receive data relating to the location of the third party when the call was made and to update data in the data storage relating to phone calls made by the user in accordance with the received location data.

4. The computer apparatus according to claim 1, the processor and data storage being constructed and arranged to store registration details of plural phone devices associated with a user, the processor and data storage being constructed and arranged to receive data relating to calls made by the user using any of the plurality of phone devices associated with the user and to consolidate the data.

5. The computer apparatus according to claim 1, the processor and data storage being constructed and arranged to receive data relating to actions selected by use of the actionable object on the user device.

6. The computer apparatus according to claim 1, the processor and data storage being constructed and arranged such that, on receipt of an instruction initiated by selection of an action by the user to share the data relating to the phone call with a third party, the processor causes the data relating to the phone call to be shared with the third party.

7. The computer apparatus according to claim 1, the processor and data storage being constructed and arranged such that the data relating to the phone call made by the user and that is transmitted to the user device comprises summary analytics relating to the phone call made by the user.

8. The computer apparatus according to claim 1, wherein the actionable object includes a user-selectable icon or button that, when selected by the user, prompts the user device to flag the phone call if the phone call is unflagged or unflag the phone call if the phone call is flagged.

9. The computer apparatus according to claim 1, wherein the actionable object includes a user-selectable icon or button that, when selected by the user, prompts the user to enter one or more tags for the phone call, where each tag is a searchable string of text.

10. The computer apparatus according to claim 9, wherein the one or more tags are automatically applied to the phone call based on one or more previous tags applied to a previous phone call from the same phone number or contact.

11. The computer apparatus according to claim 1, further comprising a call history archive in the data storage adapted to receive and store data relating to the phone call being made or having been made.

12. The computer apparatus according to claim 11, wherein the data storage is adapted to store data relating to all phone calls made by the user without the need to delete the data when a predetermined storage limit associated with the user is reached.

13. The computer apparatus according to claim 11, wherein the data in the call history archive can be exported to another device.

14. The computer apparatus according to claim 11, wherein the data relating to the phone call being made or having been made is stored in the data store with a note, comment, or tag(s) including one or more searchable text strings.

15. The computer apparatus according to claim 1, wherein voice data of the user in a phone call with a third party is recorded by the user device and stored in data storage.

16. The computer apparatus according to claim 15, wherein voice data of the third party is recorded by a user device of the third party and stored in data storage.

17. The computer apparatus according to claim 16, wherein the back-end server combines the voice data of the user and the voice data of the third party into a playable, downloadable, and sharable recording file of the phone call including the voice data of the user and the voice data of the third party.

18. The computer apparatus according to claim 15, wherein the voice data of the user is transcribed into text data.

19. The computer apparatus according to claim 18, wherein the voice data of the user is transcribed into text data by means of a microservice.

20. The computer apparatus according to claim 14, wherein the note, comment, or tag(s) are created before, during, or after the phone call by means of a voice command spoken by the user and received by the user device during the phone call.

21. The computer apparatus according to claim 1, the processor and data storage being further constructed and arranged to provide caller suggestions and call context information to the user to assist the user when placing a phone call.

22. The computer apparatus according to claim 21, wherein machine learning is used to improve the caller suggestions and call context information provided to the user when placing a phone call.

23. The computer apparatus according to claim 1, further comprising an external integration service that integrates the data relating to phone calls made by the user with third parties with customer relationship management (CRM) software or enterprise resource planning software (ERP).

24. The computer apparatus according to claim 1, the processor and data storage being further constructed and arranged to capture contact data from the user device and provide to the user call presence information about third parties in the contact data.

25. The computer apparatus according to claim 24, wherein the call presence information is selected from a group consisting of: availability of the third party to receive a call, a location associated with the third party, a time-zone associated with the third party, a calendar associated with the third party, and an indication of whether the third party is presently participating in a phone call.

26. The computer apparatus according to claim 1, wherein the phone call is a private branch exchange (PBX) phone call or a voice-over-internet-protocol (VOIP) phone call.

27. The computer apparatus according to claim 1, wherein data relating to a phone call being made or having been made by a user with a third party includes rating information with which the user indicates a quality of the phone call with the third party.

28. The computer apparatus according to claim 1, in which the processor is arranged to obtain a security token from the third party server to access the remote third party database.

29. The computer apparatus according to claim 28, in which the processor is arranged to obtain a security token from the third party server through an application running on the user device.

30. The computer apparatus according to claim 1, wherein the processor and data storage being arranged to query a remote third party server outside of the computer apparatus to obtain data relating to the phone call comprises a processor arranged to query call history data in Apple iCloud.

31. The computer apparatus according to claim 1, wherein the processor and data storage being arranged to query a remote third party server outside of the computer apparatus to obtain data relating to the phone call comprises a processor arranged to apply fuzzy matching of data in order to access the correct call history data for a particular phone call.

32. The computer apparatus according to claim 1, wherein the processor and data storage being constructed and arranged to receive data from an app running on a user device, the data relating to a phone call being made or received or having been made or received by a user with a third party comprises the processor and data storage being constructed and arranged to receive data from an app running on a user device, the app the data from an application programming interface of the user device.

\* \* \* \* \*